United States Patent
Steele et al.

(10) Patent No.: US 7,144,482 B2
(45) Date of Patent: Dec. 5, 2006

(54) METHOD AND APPARATUS FOR FORMING GROOVES WITHIN JOURNALS AND ON FLAT PLATES

(75) Inventors: Mark Greg Steele, Scotts Valley, CA (US); Dustin Alan Cochran, Watsonville, CA (US); Alexander Gredinberg, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 310 days.

(21) Appl. No.: 10/464,581

(22) Filed: Jun. 17, 2003

(65) Prior Publication Data

US 2004/0140225 A1 Jul. 22, 2004

Related U.S. Application Data

(60) Provisional application No. 60/441,681, filed on Jan. 21, 2003.

(51) Int. Cl.
*C25D 17/10* (2006.01)
*C25F 1/00* (2006.01)
*C25F 1/08* (2006.01)
*B23H 3/00* (2006.01)
*H05K 3/00* (2006.01)

(52) U.S. Cl. ............... 204/224 M; 204/280; 205/652; 205/653; 205/654; 205/668; 205/672

(58) Field of Classification Search ............... 204/212, 204/224 M, 224 R, 280; 205/640, 652–654, 205/668, 672
See application file for complete search history.

(56) References Cited

U.S. PATENT DOCUMENTS

| 5,718,145 | A * | 2/1998 | Grabbe | 72/456 |
| 6,764,590 | B1 * | 7/2004 | Cochran | 205/654 |
| 2002/0074222 | A1 * | 6/2002 | Cochran | 204/224 M |
| 2003/0221959 | A1 * | 12/2003 | Cochran | 204/280 |

* cited by examiner

*Primary Examiner*—Roy King
*Assistant Examiner*—Lois Zheng
(74) *Attorney, Agent, or Firm*—Wax Law Group

(57) ABSTRACT

An apparatus, method and means is provided for electrochemical machining of hydrodynamic bearing assemblies in spindle motors. In an aspect, a cartridge is provided that receives and accurately positions an electrode in three dimensions in a near frictionless manner. The electrode reaches and maintains an equilibrium position in response to a first and second predetermined force, the equilibrium position being a predetermined three dimensional orientation relative to the work piece and defining a critical orifice with the work piece. In an aspect, a hydrostatic bearing is employed within the electrode for radially adjusting the electrode.

21 Claims, 8 Drawing Sheets

METHOD AND APPARATUS FOR FORMING GROOVES WITHIN JOURNALS AND ON FLAT PLATES

CROSS REFERENCE TO RELATED APPLICATION

This application is based on provisional application Ser. No. 60/441,681, filed Jan. 21, 2003, entitled Hydrostatic Bearing Cartridge For ECM Grooving Applications, and assigned to the assignee of this application and incorporated herein by reference.

FIELD OF THE INVENTION

The invention relates generally to spindle motors, and more particularly to electrode positioning for forming grooves on hydrodynamic bearing assembly spindle components in disc drive data storage systems.

BACKGROUND OF THE INVENTION

Disc drive memory systems are used by computers and currently also widely used by other devices including digital cameras, digital video recorders (DVR), laser printers, photo copiers and personal music players. Disc drive memory systems store digital information that can be recorded on concentric tracks of a magnetic disc medium. Several discs are rotatably mounted on a spindle, and the information, which can be stored in the form of magnetic transitions within the discs, is accessed using read/write heads or transducers. The read/write heads are located on a pivoting arm that moves radially over the surface of the disc. The discs are rotated at high speeds during operation using an electric motor located inside a hub or below the discs. Magnets on the hub interact with a stator to cause rotation of the hub relative to the shaft. One type of motor is known as an in-hub or in-spindle motor, which typically has a spindle mounted by means of a bearing system to a motor shaft disposed in the center of the hub. The bearings permit rotational movement between the shaft and the hub, while maintaining alignment of the spindle to the shaft. The read/write heads must be accurately aligned with the storage tracks on the disc to ensure the proper reading and writing of information.

Spindle motors had in the past used conventional ball bearings between the hub and the shaft and a thrustplate. However, the demand for increased storage capacity and smaller disc drives has led to the read/write head being placed increasingly close to the disc. Currently, the close proximity requires that the disc rotate substantially in a single plane. A slight wobble or run-out in disc rotation can cause the disc to strike the read/write head, damaging the disc drive and resulting in loss of data. Because this rotational accuracy cannot be achieved using ball bearings, disc drives currently utilize a spindle motor having fluid dynamic bearings on the shaft and the thrustplate to support a hub and the disc for rotation.

In a fluid dynamic bearing, a lubricating fluid such as gas or liquid or air provides a bearing surface between a fixed member and a rotating member of the disc drive. Dynamic pressure-generating grooves (i.e., hydrodynamic grooves) formed on a surface of the fixed member or the rotating member generate a localized area of high pressure or a dynamic cushion and provide a transport mechanism for fluid or air to more evenly distribute fluid pressure within the bearing and between the rotating surfaces, enabling the spindle to rotate with a high degree of accuracy. Typical lubricants include oil and ferromagnetic fluids.

The shape of the hydrodynamic grooves is dependant on the pressure uniformity desired. The quality of the fluid displacement and therefore the pressure uniformity is generally dependant upon the groove depth and dimensional uniformity. As an example, a hydrodynamic groove having a non-uniform depth may lead to pressure differentials and subsequent premature hydrodynamic bearing or journal failure.

One known method for producing dynamic pressure-generating grooves presses and rolls a ball over the surface of a work piece. A problem with this method is the displacement of material in the work piece, resulting in ridges or spikes along the edges of the grooves. Removing these ridges is time consuming costly. A further problem is that the demand for higher disk drive rotational speeds requires the shaft and hub work pieces to be made of material that is as hard or harder than the material of the ball.

Another known method for producing the grooves of a fluid dynamic bearing uses a metal-removing tool and a fixture that moves the workpiece incrementally in the direction in which a pattern of grooves is to be formed. This approach also is not typically suitable for use with harder metals. Moreover, because each groove or portion of a groove must be individually formed and the workpiece then moved, the process is time consuming. Further, the equipment necessary for this approach is expensive and the metal-removing tool is subject to wear and requires frequent replacement.

Another known method for producing grooves involves an etching process in which the workpiece is covered with a patterned etch resistant coating prior to etching so that only the exposed portions of the workpiece are etched. One problem is the time consumed in applying and patterning the etch resistant coat. The resist coat must be baked to prior to patterning or etching. Another problem is that the coating must be removed after etching. This is frequently a difficult task, and one that can leave resist material on the workpiece surface resulting in the failure of the bearing and destruction of the disc drive. Yet another problem is that the process requires the extensive use of environmentally hazardous and toxic chemicals including photo resists, developers, solvents and strong acids.

Accordingly, there is a need for a method for forming accurate grooves in a work piece that does not require the use of a metal-removing tool that must be frequently replaced and does not use etch resistant material that could contaminate the work piece. As the result of the above-mentioned groove forming concerns, electrochemical machining (ECM) of grooves in a fluid dynamic bearing has been developed. The ECM process is generally known. However, the ECM process raises the need to accurately and simultaneously place grooves on a surface across a gap which must be very accurately measured, as the setting of the gap will determine the rate and volume at which metal ions are carried away from the surface. Deficiencies in mechanical tolerances may cause misalignment of the electrode with the work piece, causing an uneven gap and correspondingly uneven depth hydrodynamic groove. It is extremely difficult to make a tool with fixed electrodes that will guarantee a consistent work piece to electrode gap to form dimensionally consistent hydrodynamic grooves. Known methods to adjust electrodes (axially) include a worm and gear arrangement, which generates significant friction and is not reliably accurate. Some groove forming methods require the use of a coordinate measuring machine (CMM) to change the electrode. The centerline of the electrode has to be determined, and the work holder is positioned to match the centerline of the electrode, which has proven to be unreliable. Therefore, a need exists to reliably and repeatedly be able to set an accurate gap between an electrode and an interior surface of a work piece, in order to establish accurate grooves on the work piece.

SUMMARY OF THE INVENTION

An apparatus, method and means for ECM grooving of hydrodynamic bearing assemblies in spindle motors is provided. In an embodiment, the invention provides a reliable and repeatable process for setting a machining gap between an electrode and a work piece in order to create accurate grooves on the work piece. In an embodiment, a self-contained cartridge is provided that receives and positions an electrode in a near frictionless manner, in three dimensions relative to a work piece to be grooved. In an application, the cartridge maintains the electrode at a constant vertical (axial) position and pivots the electrode in a horizontal (radial) motion. In another application, the cartridge fixes the electrode in a radial position and adjusts the axial position of the electrode. In an embodiment, the cartridge provides radial adjustment of an electrode by way of an upper and a lower hydrostatic bearing that can be turned on and off, or adjusted to a desired pressure.

Features of the invention are achieved, in an embodiment, by utilizing a critical orifice to position and align the electrode relative to the work piece. A fluid (i.e., electrolyte) sets the machining gap between the electrode and the work piece. The machining gap area is varied by a predefined pressure and mass flow. The force of the fluid on a work surface displaces the electrode upward until equilibrium is reached with a downward force on the electrode provided by a vertical control displacement device. The machining gap is established without the need to make external adjustments.

Further, an adaptable cartridge is provided that allows quick changes of electrodes without the need to realign or disassemble the cartridge. The cartridge can receive and employ various electrodes including those used for grooving flat plates (i.e., thrustplates, counterplates), cylinders and cones.

Other features and advantages of this invention will be apparent to a person of skill in the art who studies the invention disclosure. Therefore, the scope of the invention will be better understood by reference to an example of an embodiment, given with respect to the following figures.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION OF THE INVENTION

Exemplary embodiments are described with reference to specific configurations. Those of ordinary skill in the art will appreciate that various changes and modifications can be made while remaining within the scope of the appended claims. Additionally, well-known elements, devices, components, methods, process steps and the like may not be set forth in detail in order to avoid obscuring the invention.

An apparatus, method and means for electrochemically forming grooves on a work piece is described herein. A reliable and repeatable process for setting a machining gap between an electrode and a work piece in order to create accurate grooves on the work piece is provided. In an embodiment, features of the discussion and claims may be applied to and utilized for forming grooves on hydrodynamic bearing assembly spindle components in disc drive data storage systems. The spindle components include flat surfaces (i.e., thrustplates and counterplates), cylinders and cones.

Figure 1:
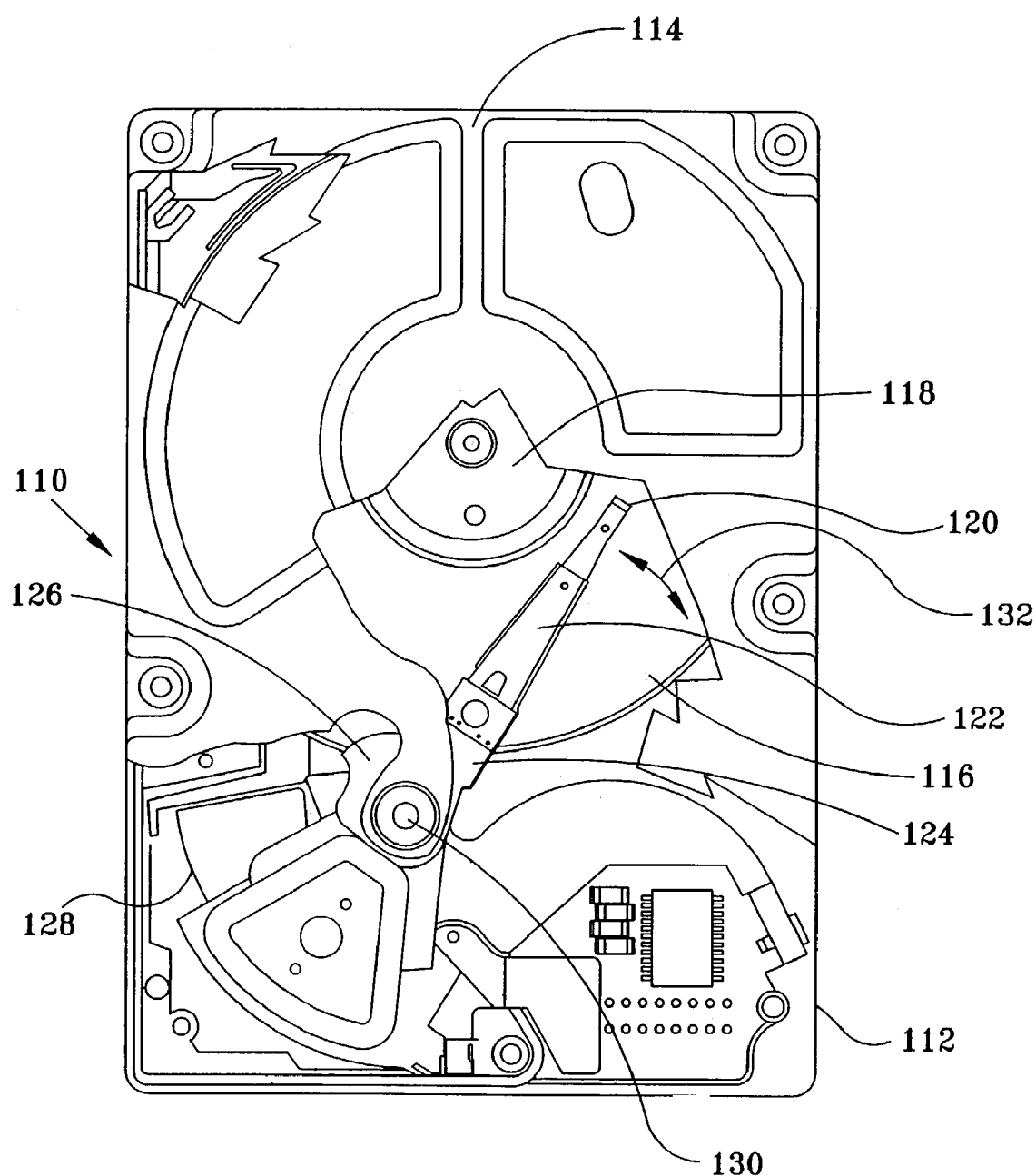
FIG. 1 is a top plain view of a disc drive data storage system in which the present invention is useful.

Referring to the drawings wherein identical reference numerals denote the same elements throughout the various views, FIG. 1 illustrates a typical disc drive data storage device 110 in which the present invention is useful. Disc drive 110 includes housing base 112 that is combined with top cover 114 to form a sealed environment.

Disc drive 110 further includes disc pack 116, which is mounted for rotation on a spindle motor (not shown) by disc clamp 118. Disc pack 116 includes a plurality of individual discs, which are mounted for co-rotation about a central axis. Each disc surface has an associated head 120 (read head and write head), which is mounted to disc drive 110 for communicating with the disc surface. In the example shown in FIG. 1, heads 120 are supported by flexures 122, which are in turn attached to head mounting arms 124 of actuator body 126. The actuator shown in FIG. 1 is of the type known as a rotary moving coil actuator and includes a voice coil motor (VCM), shown generally at 128. Voice coil motor 128 rotates actuator body 126 with its attached heads 120 about pivot shaft 130 to position heads 120 over a desired data track along arcuate path 132. This allows heads 120 to read and write magnetically encoded information on the surfaces of discs 116 at selected locations.

Figure 2:
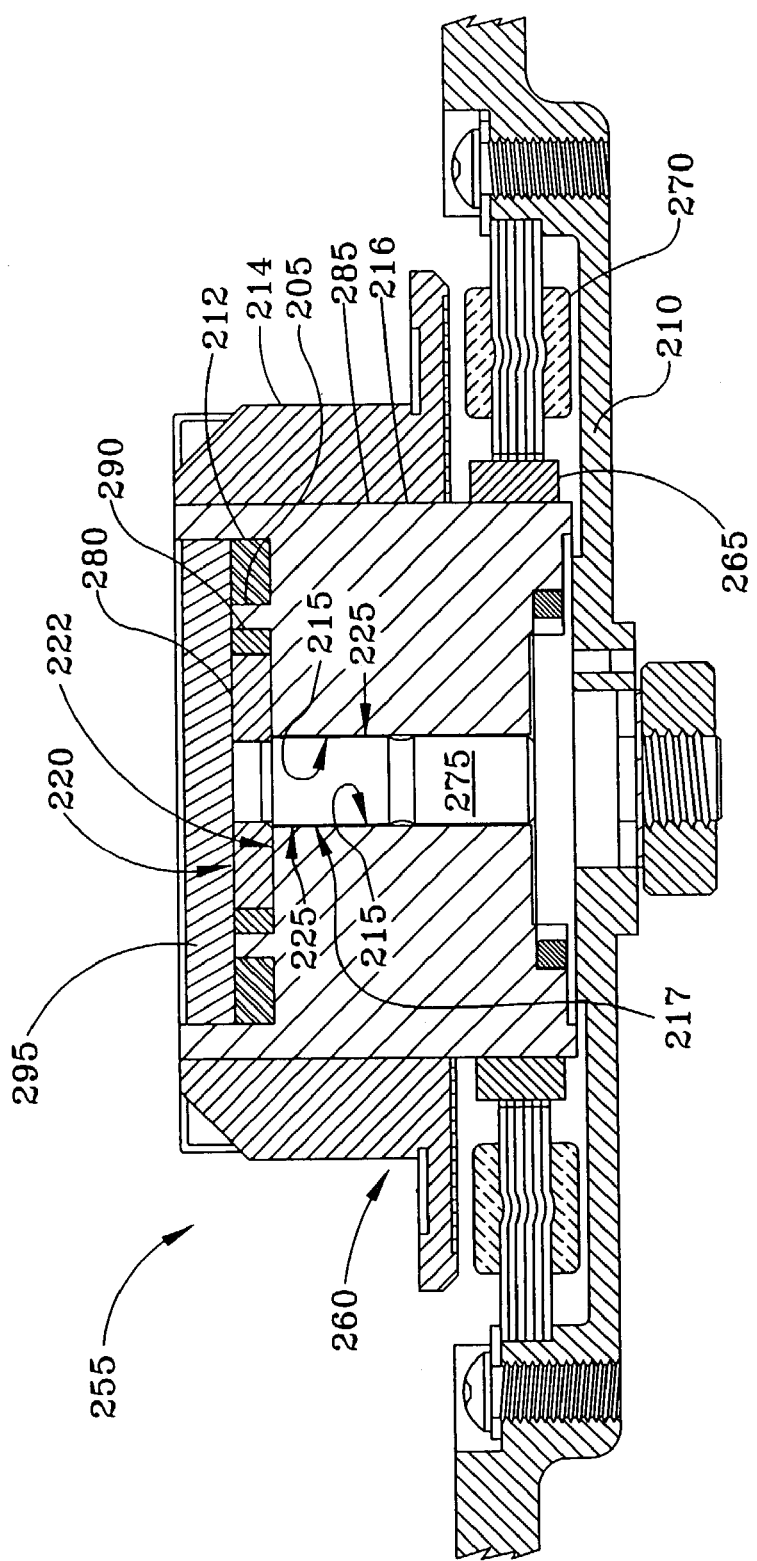
FIG. 2 is a sectional side view of a hydrodynamic bearing spindle motor, in which the present invention is useful.

FIG. 2 is a sectional side view of a hydrodynamic bearing spindle motor 255 used in disc drives 110 in which the present invention is useful. Typically, spindle motor 255 includes a stationary component and a rotatable component. The stationary component includes shaft 275 that is fixed and attached to base 210. The rotatable component includes hub 260 having one or more magnets 265 attached to a periphery thereof. The magnets 265 interact with a stator winding 270 attached to the base 210 to cause the hub 260 to rotate. Core 216 is formed of a magnetic material and acts as a back-iron for magnets 265. Magnet 265 can be formed as a unitary, annular ring or can be formed of a plurality of individual magnets that are spaced about the periphery of hub 260. Magnet 265 is magnetized to form one or more magnetic poles. It is to be appreciated that spindle motor 255 can employ a fixed shaft as shown in FIG. 2, or a rotating shaft.

The hub 260 is supported on a shaft 275 having a thrustplate 280 on one end. The thrustplate 280 can be an integral part of the shaft 275, or it can be a separate piece which is attached to the shaft, for example, by a press fit. The shaft 275 and the thrustplate 280 fit into a sleeve 285 and a thrustplate cavity 290 in the hub 260. A counter plate 295 is provided above thrustplate 280 resting on an annular ring 205 that extends from the hub 260. Counterplate 295 provides axial stability for the hydrodynamic bearing and positions hub 260 within spindle motor 255. An O-ring 212 is provided between counterplate 295 and hub 260 to seal the hydrodynamic bearing and to prevent hydrodynamic fluid from escaping. Hub 260 includes a central core 216 and a disc carrier member 214, which supports disc pack 116 (shown in FIG. 1) for rotation about shaft 275. Disc pack 116 is held on disc carrier member 214 by disc clamp 118 (also shown in FIG. 1). Hub 260 is interconnected with shaft 275 through hydrodynamic bearing 217 for rotation about shaft 275. Bearing 217 includes radial surfaces 215 and 225 and axial surfaces 220 and 222.

A fluid, such as lubricating oil or a ferromagnetic fluid fills interfacial regions between the shaft 275 and the sleeve 285, and between the thrustplate 280 and the thrustplate cavity 290 and the counter plate 295. Although the present figure is described herein with a lubricating fluid, those skilled in the art will appreciate that a lubricating gas can be used. In order to promote the flow of fluid over the bearing surfaces which are defined between the thrust plate 280 and the counterplate 295; between the thrust plate 280 and the sleeve 285; and between the shaft 275 and the sleeve 285, typically one of the two opposing surfaces of each such assembly carries sections of pressure generating grooves (not shown). The grooves induce fluid flow in the interfacial region and generate a localized region of dynamic high pressure. As sleeve 285 rotates, pressure is built up in each of its grooved regions. In this way, shaft 275 easily supports hub 260 for constant high speed rotation. The grooves are separated by raised lands or ribs and have a small depth. It can be extremely difficult to form grooves having small dimensions that are relatively closely packed on a surface. The effective operation of the pressure generating grooves depends in part on the pressure generating grooves being within a specified depth tolerance.

Figure 3:
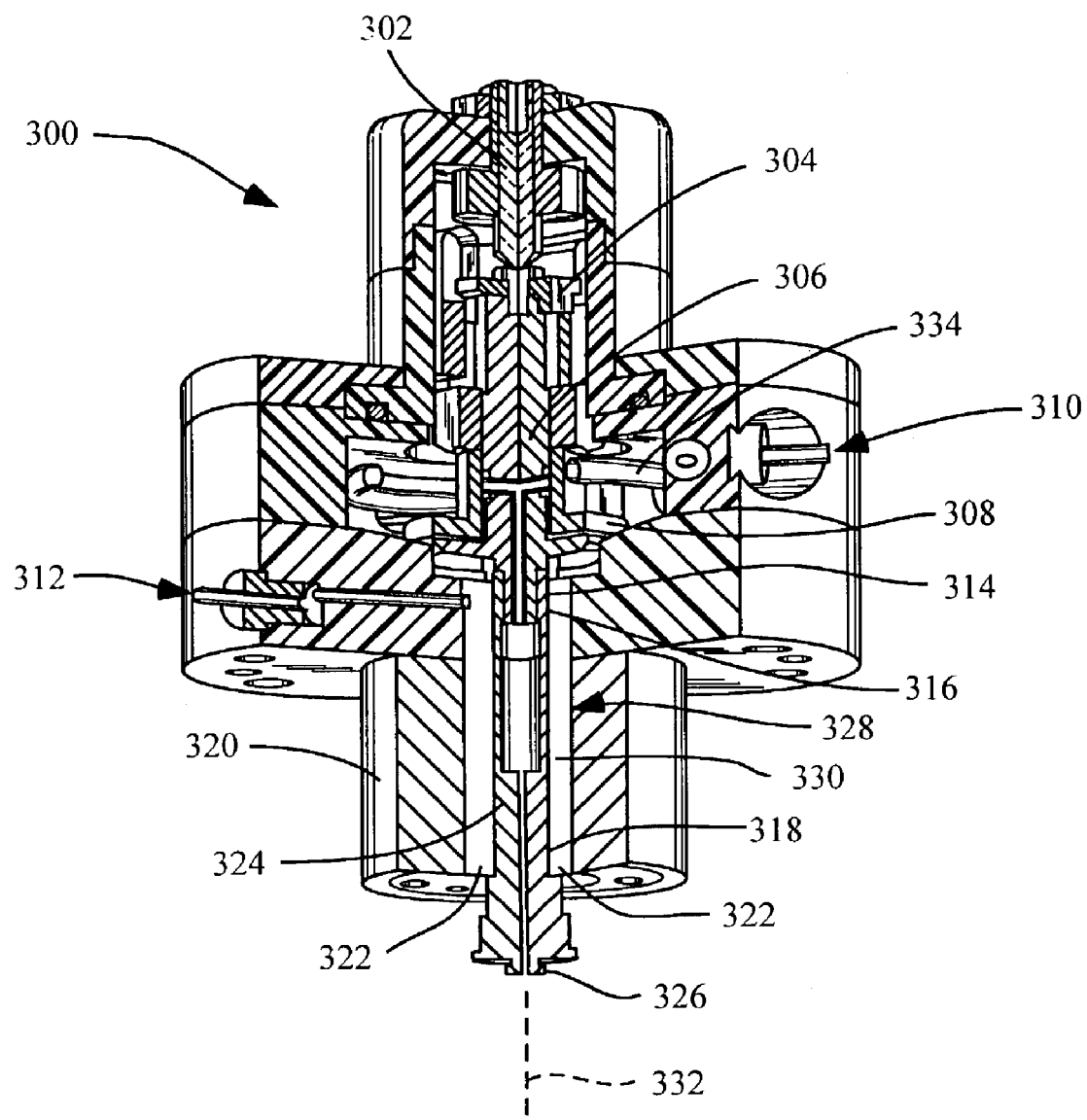
FIG. 3 is a simplified sectional view of a hydrostatic bearing cartridge assembly, in accordance with an embodiment of the present invention.

FIG. 3 is a simplified sectional view of a hydrostatic bearing cartridge assembly, in an embodiment of the present invention. Hydrostatic bearing cartridge 300 provides ECM grooving of hydrodynamic bearing assemblies in spindle motors. Hydrostatic bearing cartridge 300 is a self-contained cartridge that receives and positions electrode 324 in three dimensions and in a near frictionless manner. Hydrostatic bearing cartridge 300 is an adaptable cartridge that allows quick changes of electrodes without the need to realign the structure/cartridge, and without the need to disassemble the cartridge. Hydrostatic bearing cartridge 300 can receive and employ various electrodes used for grooving flat plates, cylinders and cones.

A general discussion of an embodiment of the components of hydrostatic bearing cartridge 300 is provided in this paragraph. Hydrostatic bearing cartridge 300 comprises a corrosion resistant material (i.e., DHS1), which includes electrolyte inlets. An electrolyte is provided to electrolyte inlet 310 for a machining gap and an electrolyte is provided to electrolyte inlet 312 for a hydrostatic bearing. From electrolyte inlet 310, electrolyte travels to electrolyte delivery hose 334 and into electrode 324 via a channel through electrode 324, for use in a machining gap. From electrolyte inlet 312 (in an example), electrolyte travels to electrode 324, through at least one of upper hydrostatic bearing 316 and lower hydrostatic bearing 318, into longitudinal bore 330, and then out electrolyte bearing exit 322. A longitudinal bore 330 is defined between electrode 324 and bearing surface 328. Electrode 324 attaches, on a first end, to an electrode attachment point 314, which repositions and essentially floats with electrode 324 within a cavity to remain near frictionless. The second and opposite end of electrode 324 is the electrode active region 326, which extends from hydrostatic bearing cartridge 300 to a work piece. Electrode attachment point 314 is situated adjacent to plenum 306. Also adjacent to plenum 306 is an electrical contact 304 for an ECM process, and an electrolyte splash seal 308. In an embodiment, a frictionless air cylinder 302 is used to apply a predetermined pressure on electrode 324 along z-axis 332. A cartridge locating surface 320 is a precision ground surface and is used to position hydrostatic bearing cartridge 300 in a superstructure.

Figure 4:
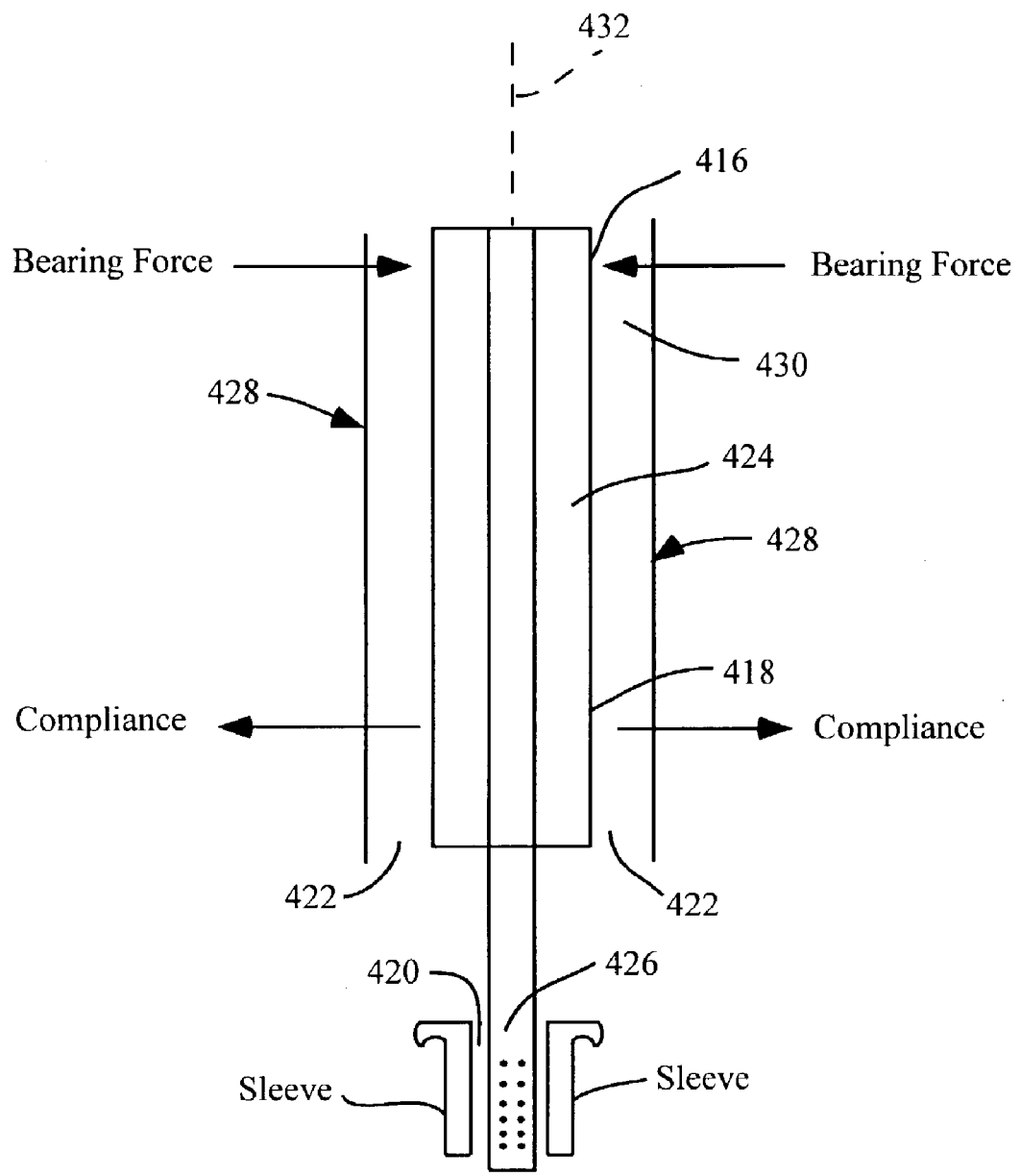
FIG. 4 is a partial and simplified sectional view of an electrode within in a hydrostatic bearing cartridge assembly, in accordance with an embodiment of the present invention.

FIG. 4 is a partial and simplified sectional view of an electrode within in a hydrostatic bearing cartridge assembly, illustrating the function of the hydrostatic bearing. Internal surfaces of the hydrostatic bearing cartridge define a longitudinal bore 430. Electrode 424 has an outside diameter sized smaller than longitudinal bore 430 to define a gap there between. Radial clearance exists between electrode 424 and bearing sleeve 428, with consideration to factors including specific gravity and the viscosity of the electrolyte provided to electrolyte inlet 412. An upper hydrostatic bearing 416 and a lower hydrostatic bearing 418 is located within longitudinal bore 430 to facilitate positioning of electrode 424 in three dimensions and in a near frictionless manner. Electrode 424 includes an active region 426 extending from one end thereof. Active region 426 has an outside diameter sized to fit within an inside diameter of a work piece. such as a sleeve.

Electrolyte for hydrostatic bearings 416 and 418 is injected into an electrolyte inlet (shown in FIG. 3) and travels into electrode 424. Radial movement of electrode 424 is facilitated when one of upper hydrostatic bearing 416 and lower hydrostatic bearing 418 is activated by flow of electrolyte there through into longitudinal bore 430 and against bearing sleeve 428. Radial movement, as described herein, is movement by electrode 424 perpendicular to z-axis 432 or movement that otherwise intersects z-axis 432. As an example, when upper hydrostatic bearing 416 is activated (turned on), electrolyte travels through upper hydrostatic bearing 416 into longitudinal bore 430, between a surface of electrode 424 and bearing sleeve 428. Concurrently, lower hydrostatic bearing 418 is turned off by preventing electrolyte from traveling through lower hydrostatic bearing 418. Electrode 424 is thereby allowed to pivot radially about upper hydrostatic bearing 416.

Three dimensional motion for an electrode is provided by the present invention. In an example, when positioning electrode 424 to groove a flat surface, such as a thrustplate or a counterplate, electrode 424 moves axially along the z-axis 432, which is perpendicular to the horizontal axis of the flat surface. Axial movement, as described herein, is movement by electrode 424 along z-axis 432. In an embodiment, electrode 424 is fixed radially by setting both upper hydrostatic bearing 416 and lower hydrostatic bearing 418 to a high pressure. In another embodiment, upper hydrostatic bearing 416 and lower hydrostatic bearing 418 are set to other pressures for fixing electrode 424 in other radial orientations. The electrolyte flowing from hydrostatic bearings 416 and 418, and through longitudinal bore 430, travels or drains through electrolyte bearing exit 422.

In an example, when positioning electrode 424 to groove a cylinder or cone, electrode 424 moves radially perpendicular to z-axis 432 and is fixed axially. Radial movement is achieved by utilizing upper hydrostatic bearing 416 and lower hydrostatic bearing 418. Upper hydrostatic bearing 416 and a lower hydrostatic bearing 418 can be set to a pressure ranging from a high pressure to a low pressure. Further, upper hydrostatic bearing 416 can be set to a different pressure than lower hydrostatic bearing 418. In other applications, electrode 424 has three dimensional freedom (moves radially and axially) to move and comply with the dynamic action of the electrolyte flowing through machining gap 420.

Figure 5:
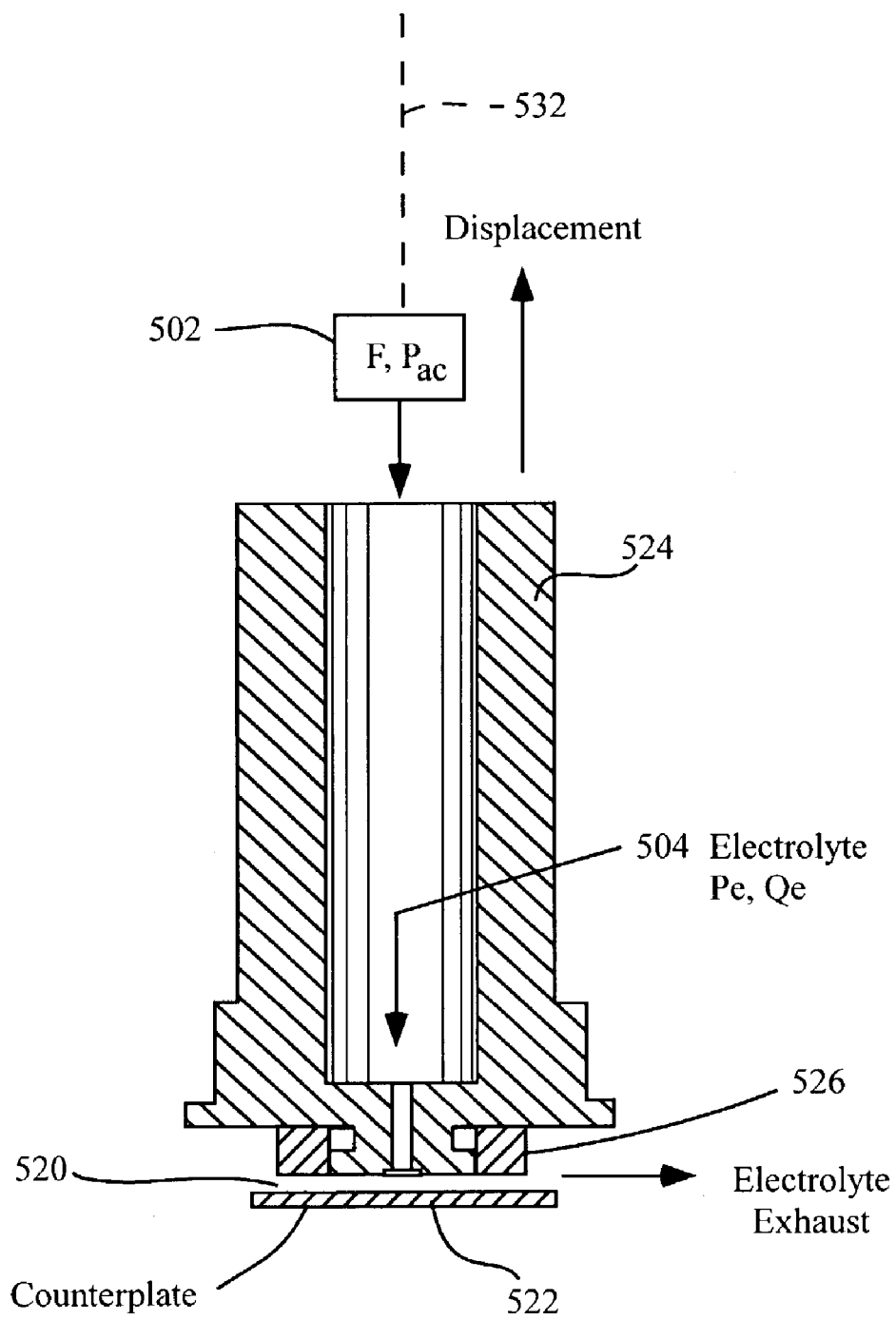
FIG. 5 is a partial and simplified sectional view illustrating the electrode positioning process with a flat surface work piece, in accordance with an embodiment of the present invention.

FIG. 5 is a partial and simplified sectional view of an electrode utilized in a hydrostatic bearing cartridge assembly, illustrating the electrode positioning process with a flat surface work piece. A frictionless air cylinder (shown in FIG. 8) creates a constant downward force 502 on electrode 524 in the direction of z-axis 532. Force (F) is caused by an air cylinder pressure ($P_{ac}$) and controlled by a super-precision regulator. In an embodiment, electrode 524 is positioned within 25 microns of its desired grooving position, and then machining gap fluid positioning is utilized, as described herein.

With continuing reference to FIG. 3, a machining gap electrolyte is injected into one or more electrolyte inlets 310 and passes through one or more electrolyte delivery hoses 334 to electrode 324 by way of plenum 306. Plenum 306 is defined as a central location in which fluids and other compounds pass to equalize and normalize before passing to electrode 324. In an embodiment, two electrolyte delivery hoses originating from opposite sides of hydrostatic bearing cartridge 300 are utilized for electrolyte injection symmetry to electrode 324. Electrolyte travels into electrode 324 via a channel through electrode 324, for use in a machining gap. An electrolyte splash seal 308 is positioned to shield against any leakage of electrolyte to other parts of hydrostatic bearing cartridge 300, and to protect against any corrosion including anodic and chemical corrosion. In an embodiment, electrolyte splash seal 308 is situated below electrolyte inlet 312 and above upper hydrostatic bearing 316.

The force of the electrolyte flowing from active region 526 displaces electrode 524 axially upward along z-axis 532 (and in some applications, radially) until equilibrium is reached with the opposing downward force 502 on electrode 524. The machining gap 520 is itself the critical orifice. In an embodiment, the critical orifice is in the range of 10 to 30 microns. The pressure of the electrolyte ($P_e$), mass flow of the electrolyte ($Q_e$) and downward force of the air cylinder (F, $P_{ac}$) are held constant, and a desired cross sectional flow area within machining gap 520 is achieved. Electrode 524 is thereby positioned in its desired three dimensional orientation above work piece 522. The desired machining gap is repeatedly established by using the same predetermined forces during the manufacturing process of numerous work pieces, without the need to make an external adjustment.

The ECM process is then executed by applying (for a predetermined interval) an electrical potential to work piece 522 and electrode 524, work piece 522 receiving the positive potential and electrode 524 serving as the cathode and receiving the negative potential. By timing the current flow, an imprint in the form of a groove pattern is placed on work piece 522. As is well-known, the width and depth of the resulting grooves is controlled by the duration and level of current applied to the work piece 522 and electrode 524. The current level is modified primarily by machining gap 520.

Electrical contact 304 is a thin copper ribbon (shown in FIG. 3) and supplies a negative charge to electrode 524 without having a position influence on electrode 524. As shall be appreciated, a thin copper ribbon or other light weight material may be utilized for electrical contact 304.

The ECM process removes material metal without the use of mechanical or thermal energy. The electrical energy (as described above) is combined with a chemical (the electrolyte) to form a reaction of reverse electroplating. Direct current is passed between work piece 522 and electrode 524, which carries the pattern to be formed, the current being passed through a conductive electrolyte between the two surfaces. At the surface of work piece 522, electrons are removed by current flow, and the metallic bonds of the molecular structure at work piece 522 surface are broken. These atoms go into solution, with the electrolyte as metal ions and form metallic hydroxides. These metallic hydroxide (MOH) molecules are carried away from machining gap 520 to be filtered out. The contaminated electrolyte may be reprocessing for reuse.

Figure 6:
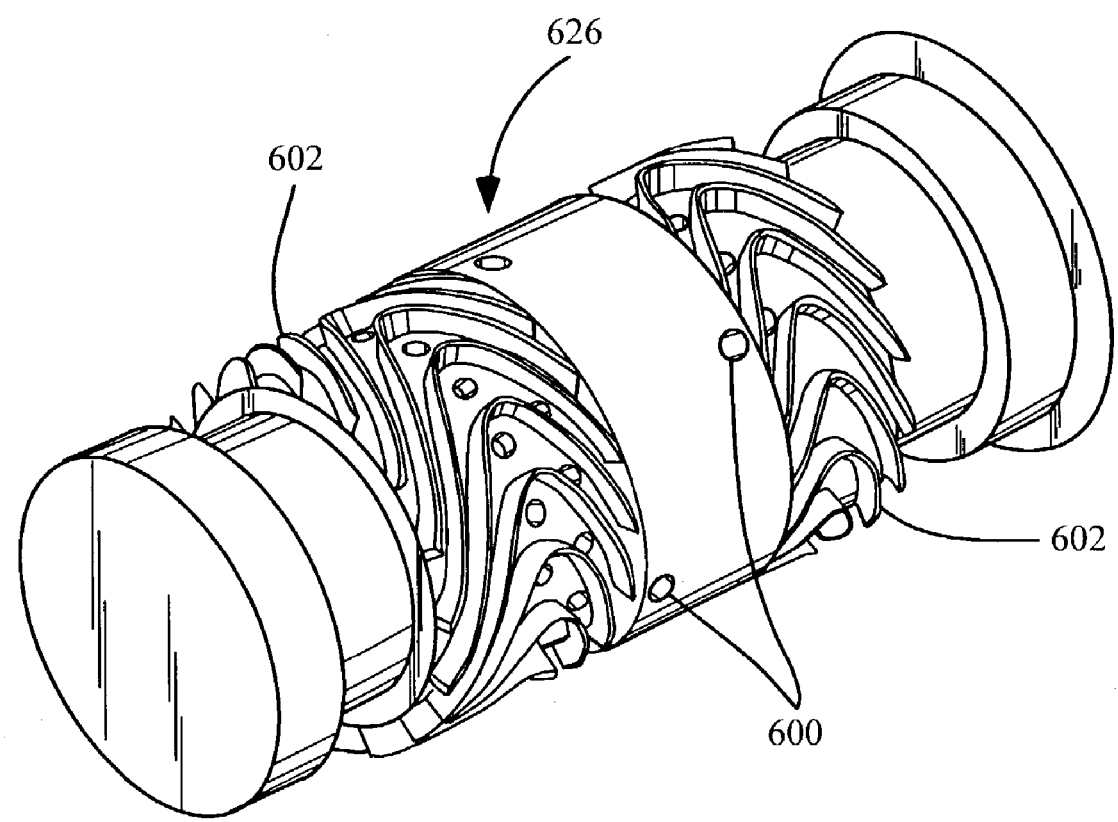
FIG. 6 is a perspective view of electrode active region illustrating injection ports and grooves, in accordance with an embodiment of the present invention.

FIG. 6 is a perspective view of an electrode active region 626 utilized to groove a cylinder or cone. Electrode active region includes grooves 602 and injection ports 600. Injection ports 600 are situated to uniformly provide electrolyte to the machining gap. In an embodiment, the injector ports are 200 microns in diameter.

Figure 7:
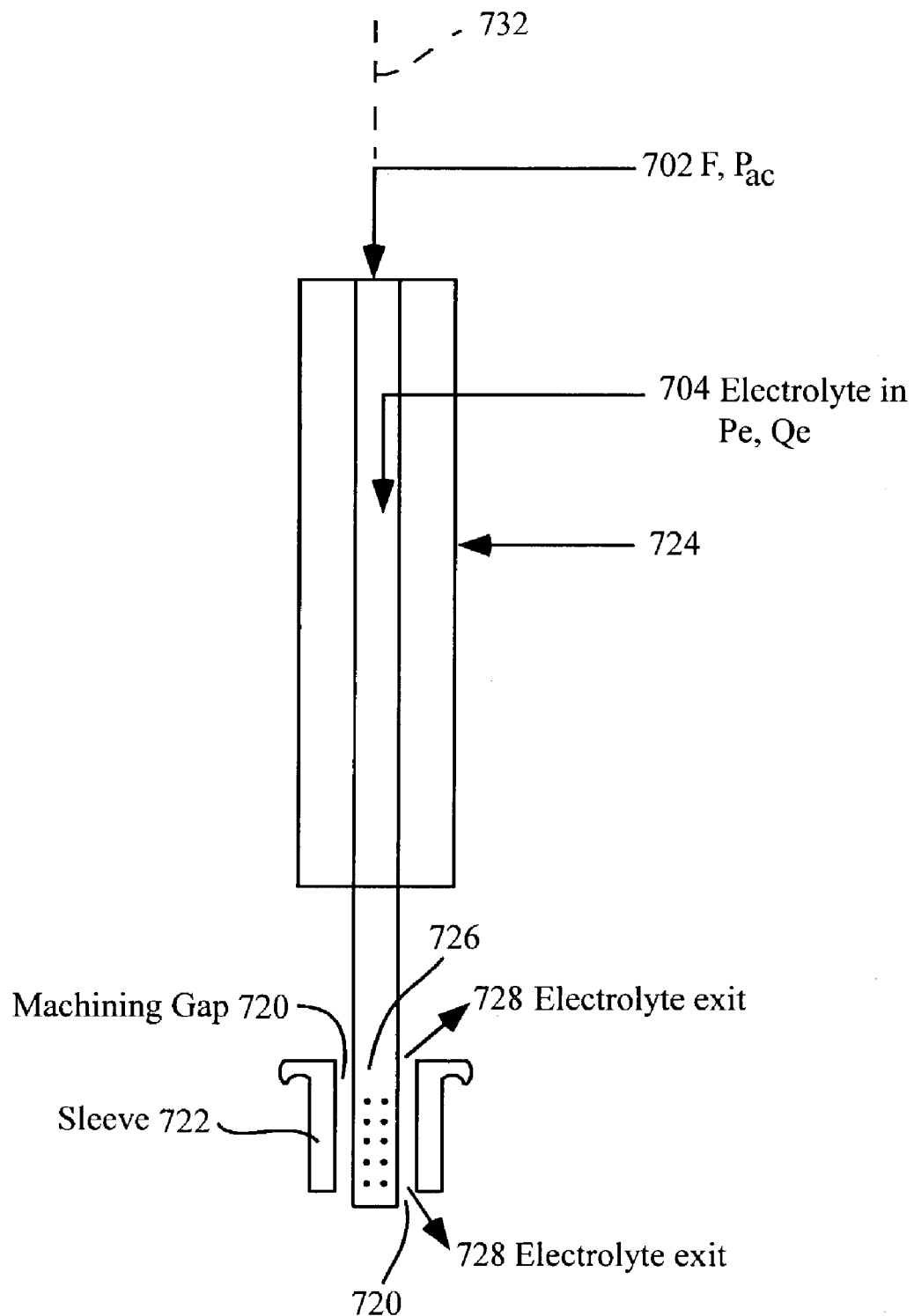
FIG. 7 is a partial and simplified sectional view illustrating the electrode positioning process with a cylinder or cone, in accordance with an embodiment of the present invention.

FIG. 7 is a partial and simplified sectional view of an electrode utilized in a hydrostatic bearing cartridge assembly, illustrating the electrode positioning process with a cylinder or cone. Electrode 724 includes an active region 726 extending from one end thereof. Active region 726 has an outside diameter sized to fit within an inside diameter of a work piece, such as a sleeve. Electrolyte is supplied to machining gap 720 through an array of injection ports 600 (FIG. 6) in electrode 724.

In an application, the force of the electrolyte flowing from active region 726 (by way of injection ports 600, FIG. 6) displaces electrode 724 axially along z-axis 732 and radially until equilibrium is reached with the downward force 702 on electrode 724. The machining gap 720 is itself the critical orifice. The pressure of the electrolyte ($P_e$), flow of the electrolyte ($Q_e$) 704 and the downward force of the air cylinder (F, $P_{ac}$) 702 are held constant, and a desired cross sectional flow area within machining gap 720 is achieved. Electrode 724 is thereby positioned in its desired orientation within a work piece such as sleeve 722. The desired machining gap is repeatedly established during the manufacturing process of grooving numerous work pieces without the need to make an external adjustment. Thereafter, the ECM process (as described above) is utilized. The electrolyte contaminated by the ECM process flows from machining gap 720 and is expelled through electrolyte exit 728, which is on the top and bottom (z-axis 732 orientation) of sleeve 722. Further, it should be appreciated that the electrolyte to the machining gap can optionally originate from the same source as the electrolyte to the hydrostatic bearings.

Figure 8:
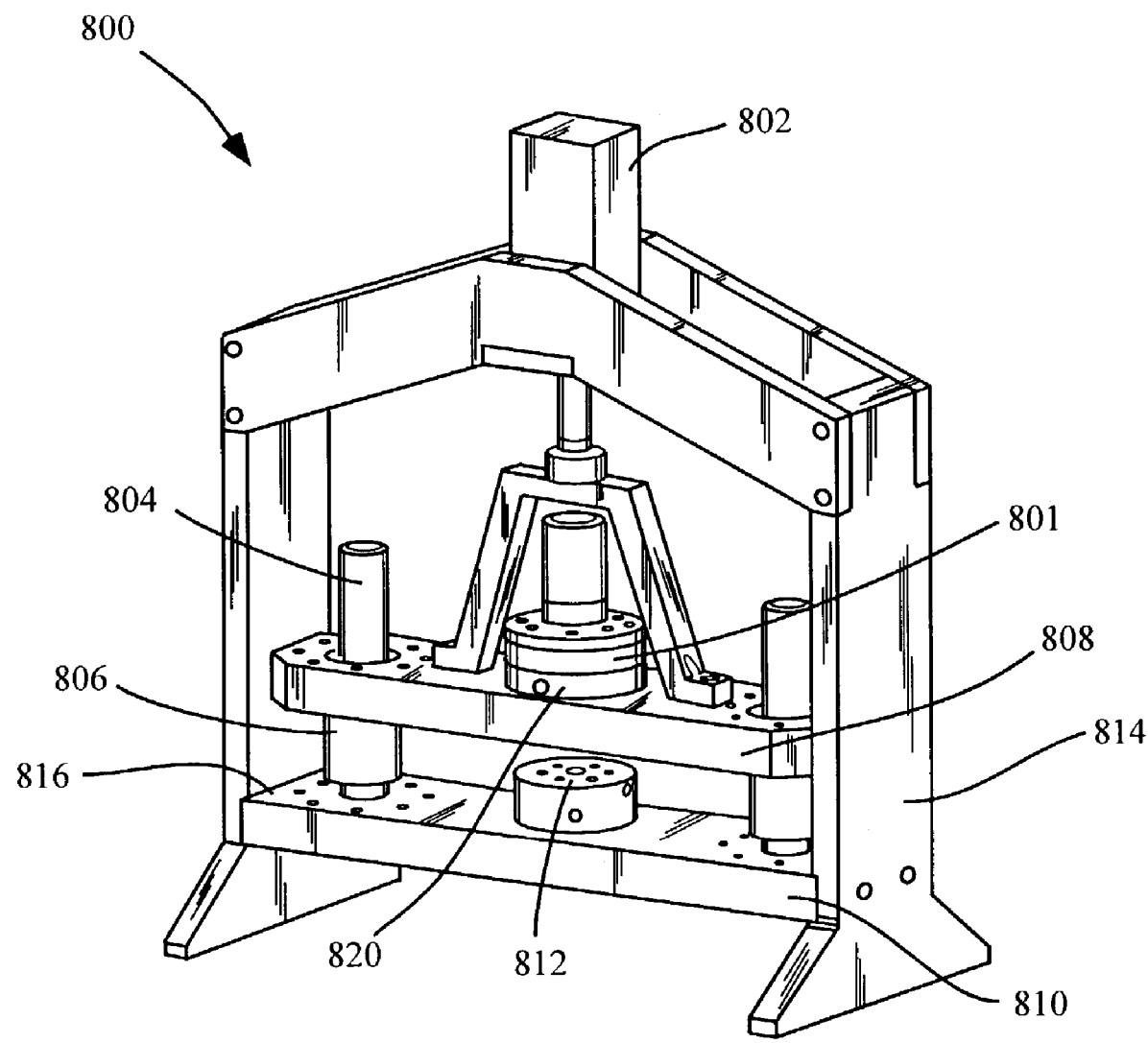
FIG. 8 is a perspective view of a hydrostatic bearing cartridge joined to a superstructure, in accordance with an embodiment of the present invention.

FIG. 8 is an example of perspective view a hydrostatic bearing cartridge 801 joined to a superstructure 800 for implementation of the grooving process. Superstructure 800 includes a frame 814, top plate 808, bottom plate 810, post 804, ball bearing bushing 806, air cylinder 802, die set 816 and a part holder 812. An expandable ring workholder or a vacuum chuck may be utilized for part holder 812. Top plate 808 receives cartridge locating surface 820 and electrode extension passes there through to define a hole within top plate 808. Bottom plate 810 receives a part holder 812 to define a hole and to receive a work piece such as a plate, cylinder or cone. In one embodiment, the concentricity of the hole within top plate 808 and the lower hole within bottom plate 810 is less than 0.0002 mm.

Groove depth is directly related and influenced by the machining gap, as discussed above. In an application, groove depths are measured and a population of groove depth data is generated in cases with and without utilizing an embodiment of the present invention. The standard deviation (sigma) from the target groove depth is calculated for both cases utilizing a binomial distribution curve. For one process, sigma shows an improvement from 0.5 microns to 0.1 microns (improvement factor of 5) when utilizing an embodiment of the present invention. Further, the sigma of 0.1 microns is likely the sigma of the measurement process itself, being below the detectable limit of process deviation.

Having disclosed exemplary embodiments, modifications and variations may be made to the disclosed embodiments while remaining within the spirit and scope of the invention as defined by the appended claims. For example, the apparatus and method described herein could be employed to form grooves on a flat plate, inside a cylinder, a single cone, a single cone cooperating with a single journal bearing or inside dual cones cooperating with one or more journal bearings. Further, in the examples discussed above, the use of a hydrodynamic bearing is shown in conjunction with a spindle motor. Clearly, the present invention is not limited to use with this particular design of a disc drive, which is shown only for purposes of the example. Further, it is to be appreciated that the present invention is useful for a wide variety of motors, especially those using fluid dynamic bearings having grooves.

We claim:

1. An apparatus for forming grooves on a work piece comprising:
  a cartridge for supporting an electrode, wherein at least a portion of the electrode has a surface including a groove pattern;
  a first input for providing a first predetermined force to a first portion of the electrode directed to move the electrode toward the work piece; and
  a second input defined by the cartridge for providing a second predetermined force, utilizing a fluid, to a second portion of the electrode directed to move the electrode away from the work piece, wherein the fluid is passed at a fixed static pressure rate between the second portion of the electrode and the work piece;
  wherein the electrode is situated for reaching and maintaining a force equilibrium position in a predetermined three dimensional orientation relative to the work piece, the equilibrium position defining a critical orifice with the work piece.

2. The apparatus as in claim 1, wherein the second input leads to a channel passing through the electrode, and wherein providing the second predetermined force comprises passing the fluid via the channel through the electrode toward the work piece.

3. The apparatus as in claim 1, further comprising a hydrostatic bearing, adjacent to the electrode, for radially controlling the electrode.

4. The apparatus as in claim 3, wherein the hydrostatic bearing comprises an upper hydrostatic bearing and a lower hydrostatic bearing.

5. The apparatus as in claim 4, further comprising a third input defined by the cartridge for supplying a hydrostatic bearing fluid to at least one of the upper hydrostatic bearing and the lower hydrostatic bearing, wherein the upper hydrostatic bearing and the lower hydrostatic bearing are configurable to a predetermined pressure and separately controlled for one of allowing the electrode to pivot and radially restraining the electrode.

6. The apparatus as in claim 1, further comprising an electrode attachment point defined by the cartridge for connecting one of a variety of electrodes including electrodes for grooving flat plates, cylinders and cones, wherein the electrode attachment point repositions with the electrode.

7. The apparatus as in claim 1, wherein the critical orifice is 10 to 30 microns, and wherein the work piece is one of a flat plate, cylinder and cone.

8. The apparatus as in claim 1, further comprising a frictionless air cylinder for applying the first predetermined force.

9. The apparatus as in claim 1, further comprising an electrical contact for applying an electrical potential to the electrode, wherein the electrical contact is a copper ribbon.

10. The apparatus as in claim 9, wherein the second input is configured for passing an electrolyte, and wherein an electrochemical machining process is utilized to groove the work piece.

11. The apparatus as in claim 5, further comprising an electrolyte splash seal adjacent to the third input.

12. The apparatus as in claim 1, further comprising a cartridge locating surface at a perimeter of the cartridge having a precision ground surface to position the apparatus in a superstructure.

13. An apparatus for electrochemically forming grooves on a work piece comprising:
  a means for providing a first predetermined force to a first portion of an electrode directed to move the electrode toward the work piece, a portion of the electrode having a surface including grooves; and
  a means for providing a second predetermined force, utilizing a fluid, to a second portion of the electrode, via a cartridge, directed to move the electrode away from the work piece, wherein the fluid is passed at a fixed static pressure rate between the second portion of the electrode and the work piece;
  wherein the electrode is situated for reaching and maintaining a force equilibrium position in a predetermined three dimensional orientation relative to the work piece, the equilibrium position defining a critical orifice with the work piece; and
  wherein the work piece is one of a flat surface, a cylinder and a cone.

14. The apparatus as in claim 13, further comprising a means for radially controlling the electrode.

15. The apparatus as in claim 14, wherein means for radially controlling the electrode comprises a hydrostatic bearing adjacent to the electrode.

16. The apparatus as in claim 15, wherein the hydrostatic bearing comprises an upper hydrostatic bearing and a lower hydrostatic bearing.

17. The apparatus as in claim 16, further comprising a means for supplying a hydrostatic bearing fluid to at least one of the upper hydrostatic bearing and the lower hydrostatic bearing, wherein the upper hydrostatic bearing and the lower hydrostatic bearing are configurable to a predetermined pressure and separately controlled for one of allowing the electrode to pivot and radially restraining the electrode.

18. The apparatus as in claim 13, wherein means for providing the first predetermined force comprises a frictionless air cylinder.

19. The apparatus as in claim 13, further comprising a means for applying an electrical potential to the electrode.

20. The apparatus as in claim 19, wherein means for applying the electrical potential to the electrode comprises a copper ribbon contact.

21. The apparatus as in claim 13, wherein means for providing the second predetermined force comprises passing an electrolyte via a channel through the electrode toward the work piece, and wherein an electrochemical machining process is utilized to groove the work piece.

* * * * *